US010458340B2

United States Patent
Lefebvre

(10) Patent No.: US 10,458,340 B2
(45) Date of Patent: Oct. 29, 2019

(54) TURBINE SHAFT POWER TAKE-OFF

(71) Applicant: PRATT & WHITNEY CANADA CORP., Longueuil (CA)

(72) Inventor: Guy Lefebvre, St-Bruno-de-Montarville (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 253 days.

(21) Appl. No.: 15/407,414

(22) Filed: Jan. 17, 2017

(65) Prior Publication Data
US 2018/0023482 A1 Jan. 25, 2018

Related U.S. Application Data

(60) Provisional application No. 62/363,949, filed on Jul. 19, 2016, provisional application No. 62/363,947, (Continued)

(51) Int. Cl.
*F02C 7/36* (2006.01)
*B64D 35/04* (2006.01)
(Continued)

(52) U.S. Cl.
CPC .............. *F02C 7/36* (2013.01); *B64D 27/10* (2013.01); *B64D 35/04* (2013.01); *F01D 5/026* (2013.01);
(Continued)

(58) Field of Classification Search
CPC .. F02C 7/36; F02C 3/113; F02C 3/145; F02C 3/107; F02C 7/32; F02C 6/206;
(Continued)

(56) References Cited

U.S. PATENT DOCUMENTS 2,548,975 A 4/1951 Hawthorne
2,747,367 A * 5/1956 Savin, Jr. .............. F01D 21/006
415/199.5
(Continued)

FOREIGN PATENT DOCUMENTS

CA 2562290 C 10/2013
CA 2970386 1/2018
(Continued)

OTHER PUBLICATIONS

A New Approach to Turboshaft Engine Growth, M. A. Compagnon, General Electric Company, Lynn,Massachusetts pp. 80-41-1 to 80-41-6, May 13, 1980.
(Continued)

*Primary Examiner* — Joseph J Dallo
(74) *Attorney, Agent, or Firm* — Norton Rose Fulbright Canada L.L.P.

(57) ABSTRACT

A multi-spool gas turbine engine comprises a low pressure (LP) spool and a high pressure (HP) spool independently rotatable of one another about an engine axis. The LP spool comprises an LP turbine, an LP compressor and an LP shaft. The HP pressure spool comprises an HP turbine, an HP compressor and an HP shaft. The LP turbine is in fluid flow communication with the HP turbine and disposed downstream therefrom. The HP compressor is in fluid flow communication with the LP compressor and disposed downstream therefrom. The LP shaft has an upstream shaft portion extending upstream of the LP turbine to a location upstream of the LP compressor to provide a first power take-off at an upstream end of the engine and a downstream shaft portion extending downstream of the LP turbine to provide a second power take-off at a downstream end of the engine, thereby allowing mounting of a reduction gear box at either end of the engine.

20 Claims, 2 Drawing Sheets

Related U.S. Application Data filed on Jul. 19, 2016, provisional application No. 62/363,952, filed on Jul. 19, 2016, provisional application No. 62/363,955, filed on Jul. 19, 2016, provisional application No. 62/363,956, filed on Jul. 19, 2016.

(51) Int. Cl.
```
F02C 3/08      (2006.01)
F01D 5/02      (2006.01)
F02C 3/113     (2006.01)
B64D 27/10     (2006.01)
F01D 15/12     (2006.01)
F02C 3/10      (2006.01)
F02K 3/06      (2006.01)
F01D 25/18     (2006.01)
F02C 7/32      (2006.01)
F16H 57/04     (2010.01)
F02C 3/107     (2006.01)
F02C 3/14      (2006.01)
F02C 6/20      (2006.01)
```

(52) U.S. Cl.
CPC ............. *F01D 15/12* (2013.01); *F01D 25/18* (2013.01); *F02C 3/08* (2013.01); *F02C 3/10* (2013.01); *F02C 3/107* (2013.01); *F02C 3/113* (2013.01); *F02C 3/145* (2013.01); *F02C 6/206* (2013.01); *F02C 7/32* (2013.01); *F02K 3/06* (2013.01); *F16H 57/0495* (2013.01); *F05D 2220/32* (2013.01); *F05D 2220/323* (2013.01); *F05D 2220/324* (2013.01); *F05D 2220/329* (2013.01); *F05D 2230/70* (2013.01); *F05D 2230/72* (2013.01); *F05D 2240/61* (2013.01); *F05D 2250/36* (2013.01); *F05D 2260/31* (2013.01); *F05D 2260/36* (2013.01); *F05D 2260/40* (2013.01); *F05D 2260/4031* (2013.01); *F05D 2260/40311* (2013.01); *F05D 2260/98* (2013.01); *Y02T 50/671* (2013.01)

(58) Field of Classification Search
CPC . F02C 3/10; F01D 25/18; F01D 15/12; F16H 57/0495; F02K 3/06; B64D 27/10; Y02T 50/671; F05D 2230/70; F05D 2220/324
See application file for complete search history.

(56) References Cited

U.S. PATENT DOCUMENTS

| | | |
|---|---|---|
| 2,929,207 A * | 3/1960 | Peterson .............. F02C 6/02 60/224 |
| 2,955,424 A | 10/1960 | Hryniszak |
| 2,984,977 A * | 5/1961 | Embree ................ F02C 9/32 137/85 |
| 3,152,443 A | 10/1964 | Newland |
| 3,170,292 A * | 2/1965 | Howes ................ F01D 25/18 184/6.11 |
| 3,204,406 A * | 9/1965 | Howes ................ F02C 3/10 60/39.17 |
| 3,209,536 A * | 10/1965 | Howes ................ F02C 3/10 417/405 |
| 3,255,825 A | 6/1966 | Mouille et al. |
| 3,488,947 A | 1/1970 | Miller |
| 3,529,419 A | 9/1970 | Reed |
| 3,762,161 A | 10/1973 | Pennig |
| 3,874,811 A | 4/1975 | Dennison |
| 4,030,288 A | 6/1977 | Davis |
| 4,055,949 A | 11/1977 | Boudigues |
| 4,141,212 A | 2/1979 | Koschier |
| 4,251,987 A | 2/1981 | Adamson |
| 4,498,291 A | 2/1985 | Jefferey |
| 4,531,694 A | 7/1985 | Soloy |
| 4,611,464 A | 9/1986 | Hetzer |
| 4,685,286 A | 8/1987 | Hetzer et al. |
| 4,744,214 A | 5/1988 | Monsarrat |
| 4,765,135 A | 8/1988 | Lardellier |
| 4,815,282 A | 3/1989 | Wilkinson et al. |
| 4,817,382 A | 4/1989 | Rudolph et al. |
| 4,864,812 A | 9/1989 | Rodgers |
| 4,934,140 A | 6/1990 | Dennison |
| 5,119,624 A | 6/1992 | McKenna |
| 5,159,808 A | 11/1992 | Kast |
| 5,161,364 A | 11/1992 | Bruun |
| 5,220,784 A | 6/1993 | Wilcox |
| 5,309,708 A | 5/1994 | Stewart |
| 5,473,883 A | 12/1995 | Naudet |
| 6,041,589 A | 3/2000 | Giffin, III et al. |
| 6,082,967 A | 7/2000 | Loisy |
| 6,247,668 B1 | 6/2001 | Reysa |
| 6,606,863 B2 | 8/2003 | Napier |
| 6,735,954 B2 | 5/2004 | MacFarlane et al. |
| 6,855,089 B2 | 2/2005 | Poulin |
| 6,865,891 B2 | 3/2005 | Walsh et al. |
| 6,895,741 B2 | 5/2005 | Rago et al. |
| 6,901,759 B2 | 6/2005 | Frutschi |
| 7,055,303 B2 | 6/2006 | Macfarlane et al. |
| 7,144,349 B2 | 12/2006 | Mitrovic |
| 7,168,913 B2 | 1/2007 | Lardellier |
| 7,500,365 B2 | 3/2009 | Suciu et al. |
| 7,552,591 B2 | 6/2009 | Bart |
| 7,690,185 B2 | 4/2010 | Linet et al. |
| 7,698,884 B2 | 4/2010 | Maguire et al. |
| 7,707,909 B2 | 5/2010 | Linet et al. |
| 7,758,302 B2 | 7/2010 | Linet |
| 7,762,084 B2 | 7/2010 | Martis |
| 8,176,725 B2 | 5/2012 | Norris |
| 8,209,952 B2 | 7/2012 | Ress, Jr. |
| 8,220,245 B1 | 7/2012 | Papandreas |
| 8,350,398 B2 | 1/2013 | Butt |
| 8,459,038 B1 | 6/2013 | Lickfold et al. |
| 8,464,511 B1 | 6/2013 | Ribarov et al. |
| 8,500,583 B2 | 8/2013 | Goi et al. |
| 8,516,789 B2 | 8/2013 | Kupratis |
| 8,568,089 B2 | 10/2013 | Lemmers, Jr. et al. |
| 8,621,871 B2 | 1/2014 | McCune et al. |
| 8,689,538 B2 | 4/2014 | Sankrithi |
| 8,794,922 B2 | 8/2014 | Bart et al. |
| 8,845,292 B2 | 9/2014 | Lafont |
| 8,853,878 B1 | 10/2014 | White |
| 9,062,611 B2 | 6/2015 | Sheridan |
| 9,126,691 B2 | 9/2015 | Cloft |
| 9,145,834 B2 | 9/2015 | Frost et al. |
| 9,239,004 B2 | 1/2016 | Kupratis |
| 9,297,305 B2 | 3/2016 | Drachsler et al. |
| 9,322,341 B2 | 4/2016 | Belleville |
| 9,328,667 B2 | 5/2016 | MacFarlane |
| 9,341,121 B2 | 5/2016 | Kupratis |
| 9,353,848 B2 | 5/2016 | Blewett et al. |
| 9,512,784 B2 | 12/2016 | Morgan et al. |
| 9,719,465 B2 | 8/2017 | Suciu |
| 9,745,860 B1 | 8/2017 | Haskin |
| 9,752,500 B2 | 9/2017 | Ullyott |
| 9,752,610 B2 | 9/2017 | Rousseau |
| 9,784,182 B2 | 10/2017 | Dhanuka |
| 9,819,292 B2 | 11/2017 | Thatcher |
| 9,828,911 B2 | 11/2017 | Burghardt |
| 9,890,704 B2 | 2/2018 | Speak et al. |
| 9,926,849 B2 | 3/2018 | Frost et al. |
| 9,932,858 B2 | 4/2018 | Miller |
| 10,054,001 B2 | 8/2018 | Beutin et al. |
| 10,072,570 B2 | 9/2018 | Kupratis |
| 10,094,295 B2 | 10/2018 | Ullyott et al. |
| 10,125,722 B2 | 11/2018 | Kupratis |
| 10,132,198 B2 | 11/2018 | Baba |
| 2003/0051483 A1 | 3/2003 | Napier |
| 2005/0060983 A1 | 3/2005 | Lardellier |
| 2006/0010152 A1 | 1/2006 | Catalano |
| 2006/0137355 A1 | 6/2006 | Welch et al. |
| 2007/0240427 A1 | 10/2007 | Ullyott |
| 2008/0081733 A1 | 4/2008 | Hattenbach |

(56) References Cited

U.S. PATENT DOCUMENTS

| | | |
|---|---|---|
| 2008/0138195 A1* | 6/2008 | Kern ............... F02C 3/113 415/122.1 |
| 2008/0148881 A1 | 6/2008 | Moniz et al. |
| 2009/0015011 A1 | 1/2009 | Colin |
| 2009/0188334 A1 | 7/2009 | Merry |
| 2009/0288421 A1 | 11/2009 | Zeiner |
| 2009/0322088 A1 | 12/2009 | Dooley |
| 2010/0164234 A1* | 7/2010 | Bowman ............... F02C 7/32 290/1 R |
| 2010/0180568 A1 | 7/2010 | Sachs |
| 2010/0212285 A1 | 8/2010 | Negulescu |
| 2010/0281875 A1 | 11/2010 | Price |
| 2011/0056183 A1 | 3/2011 | Sankrithi |
| 2011/0056208 A1* | 3/2011 | Norris ............... F02C 3/107 60/772 |
| 2011/0171030 A1 | 7/2011 | Swift |
| 2011/0284328 A1* | 11/2011 | Brandt ............... F01D 25/18 184/6.11 |
| 2012/0121417 A1 | 5/2012 | Lafont |
| 2013/0031912 A1 | 2/2013 | Finney |
| 2013/0056982 A1 | 3/2013 | Gozdawa |
| 2013/0098066 A1 | 4/2013 | Gallet |
| 2013/0139518 A1* | 6/2013 | Morgan ............... F02C 7/36 60/773 |
| 2013/0145769 A1 | 6/2013 | Norris |
| 2013/0186058 A1 | 7/2013 | Sheridan |
| 2013/0255224 A1 | 10/2013 | Kupratis |
| 2014/0069107 A1 | 3/2014 | Macfarlane |
| 2014/0130352 A1 | 5/2014 | Buldtmann et al. |
| 2014/0150401 A1 | 6/2014 | Venter |
| 2014/0250862 A1 | 9/2014 | Suciu et al. |
| 2014/0252160 A1 | 9/2014 | Suciu et al. |
| 2014/0255147 A1 | 9/2014 | Root |
| 2014/0256494 A1 | 9/2014 | Lewis |
| 2014/0260295 A1* | 9/2014 | Ullyott ............... F02C 3/113 60/774 |
| 2014/0290265 A1 | 10/2014 | Ullyott |
| 2014/0297155 A1 | 10/2014 | Chen |
| 2015/0013307 A1 | 1/2015 | Burghardt |
| 2015/0150401 A1 | 6/2015 | Bennett |
| 2015/0167549 A1 | 6/2015 | Ribarov |
| 2015/0292544 A1 | 10/2015 | Rousseau |
| 2015/0337738 A1 | 11/2015 | Suciu |
| 2015/0369123 A1 | 12/2015 | Hanrahan |
| 2015/0377125 A1 | 12/2015 | Kupratis |
| 2016/0040601 A1 | 2/2016 | Frost |
| 2016/0090871 A1* | 3/2016 | Olsen ............... F16C 33/6685 416/174 |
| 2016/0169118 A1 | 6/2016 | Duong |
| 2016/0201490 A1* | 7/2016 | Scott ............... F01D 25/24 415/213.1 |
| 2016/0208690 A1 | 7/2016 | Zimmitti |
| 2016/0215694 A1* | 7/2016 | Brostmeyer ............ F02C 7/143 |
| 2016/0230843 A1 | 8/2016 | Duong et al. |
| 2016/0245185 A1 | 8/2016 | Lamarre et al. |
| 2016/0290226 A1 | 10/2016 | Roberge |
| 2016/0305261 A1* | 10/2016 | Orosa ............... F01D 15/10 |
| 2016/0319845 A1 | 11/2016 | Molnar |
| 2016/0333791 A1 | 11/2016 | Snyder et al. |
| 2016/0341214 A1 | 11/2016 | O'Toole |
| 2016/0363055 A1 | 12/2016 | Edwards |
| 2017/0108084 A1 | 4/2017 | Chmylkowski |
| 2017/0122122 A1 | 5/2017 | Lepretre |
| 2017/0191381 A1 | 7/2017 | Baba |
| 2017/0191413 A1 | 7/2017 | Knight |
| 2017/0211477 A1* | 7/2017 | Menheere ............ F02C 7/36 |
| 2017/0211484 A1 | 7/2017 | Sheridan |
| 2017/0306841 A1 | 10/2017 | Skertic |
| 2017/0314469 A1 | 11/2017 | Roever |
| 2017/0314474 A1 | 11/2017 | Wotzak |
| 2017/0327241 A1* | 11/2017 | Mitrovic ............ B64C 27/12 |
| 2017/0356347 A1 | 12/2017 | Scothern et al. |
| 2017/0356452 A1 | 12/2017 | Mastro |
| 2017/0370284 A1 | 12/2017 | Harvey |
| 2018/0016989 A1 | 1/2018 | Abe |
| 2018/0023481 A1 | 1/2018 | Lefebvre |
| 2018/0023482 A1 | 1/2018 | Lefebvre |
| 2018/0045068 A1 | 2/2018 | Brinson et al. |
| 2018/0058330 A1 | 3/2018 | Munevar |
| 2018/0073428 A1 | 3/2018 | Morgan |
| 2018/0073429 A1 | 3/2018 | Dubreuil |
| 2018/0073438 A1 | 3/2018 | Durocher et al. |
| 2018/0135522 A1 | 5/2018 | Mitrovic et al. |
| 2018/0149091 A1 | 5/2018 | Howell et al. |
| 2018/0163640 A1 | 6/2018 | Dubreuil et al. |
| 2018/0171815 A1 | 6/2018 | Suciu et al. |
| 2018/0172012 A1 | 6/2018 | Plante et al. |
| 2018/0202310 A1 | 7/2018 | Suciu et al. |
| 2018/0202368 A1 | 7/2018 | Suciu et al. |
| 2018/0208322 A1 | 7/2018 | Tantot |
| 2018/0216525 A1 | 8/2018 | Plante et al. |
| 2018/0223739 A1 | 8/2018 | Dubreuil et al. |
| 2018/0283281 A1 | 10/2018 | Veilleux, Jr. et al. |
| 2018/0291817 A1 | 10/2018 | Suciu et al. |
| 2018/0313274 A1 | 11/2018 | Suciu et al. |
| 2018/0347471 A1 | 12/2018 | Wotzak |

FOREIGN PATENT DOCUMENTS

| | | |
|---|---|---|
| CA | 2970389 | 1/2018 |
| CA | 2975558 | 6/2018 |
| EP | 0103370 | 3/1984 |
| EP | 0860593 B1 | 9/2003 |
| EP | 1908938 | 4/2004 |
| EP | 2226487 | 9/2010 |
| EP | 2295763 | 3/2011 |
| EP | 2320067 | 5/2011 |
| EP | 1959114 B1 | 5/2012 |
| EP | 2728140 | 5/2014 |
| EP | 3043056 | 7/2016 |
| EP | 3273031 | 1/2018 |
| EP | 3273034 | 1/2018 |
| EP | 3273032 | 4/2018 |
| EP | 3309371 | 4/2018 |
| FR | 991975 | 10/1951 |
| FR | 1262452 | 5/1961 |
| FR | 1594317 | 6/1970 |
| GB | 713839 | 8/1954 |
| GB | 1102591 | 2/1968 |
| WO | WO95/02120 A1 | 1/1995 |
| WO | 2005/061873 | 7/2005 |
| WO | WO200845068 | 4/2008 |
| WO | WO201533336 | 3/2015 |
| WO | 20150122948 | 8/2015 |
| WO | WO2015122948 | 8/2015 |
| WO | WO2017/198999 | 11/2017 |

OTHER PUBLICATIONS

U.S. Appl. No. 15/384,959, filed Dec. 20, 2016.

European Search Report dated Nov. 30, 2017 in related EP application No. 17182102.8.

European Search Report dated Dec. 12, 2017 in related EP application No. 17182076.4.

European Search Report dated Dec. 12, 2017 in counterpart EP application No. 17182096.2.

European Search Report dated Jan. 31, 2018 in related EP application No. 17185796.4.

European Search Report dated Mar. 19, 2018 in related EP application No. 17182087.1.

European Search Report dated Mar. 21, 2018 in related EP application No. 17182094.7.

European Search Report dated Apr. 6, 2018 in related EP application No. 17193893.9.

European Search Report dated May 25, 2018 in related EP application No. 17191309.8.

European Search Report dated May 25, 2018 in related EP application No. 17186249.3.

European Search Report dated Jul. 2, 2018 in relating EP application No. °18154161.6.

(56) References Cited

OTHER PUBLICATIONS

United Training Corp., PT6 Descriptive Course and Guide to Troubleshooting, Dec. 2016, Pub: United Training Corp., pp. 1-6 (Year: 2016).
Light International, PT6: Turboprop Phenomenon, Jan. 31,-Feb. 6, 1990, Reed Business 3ublishing Ltd, pp. 32-36. (Year: 1990).
Guy Norris, GE Takes on PT6 Engine With Advanced Turboprop, Nov. 17, 2015, Aviation Week Intelligence Network, pp. 1-3 (Year: 2015).

\* cited by examiner

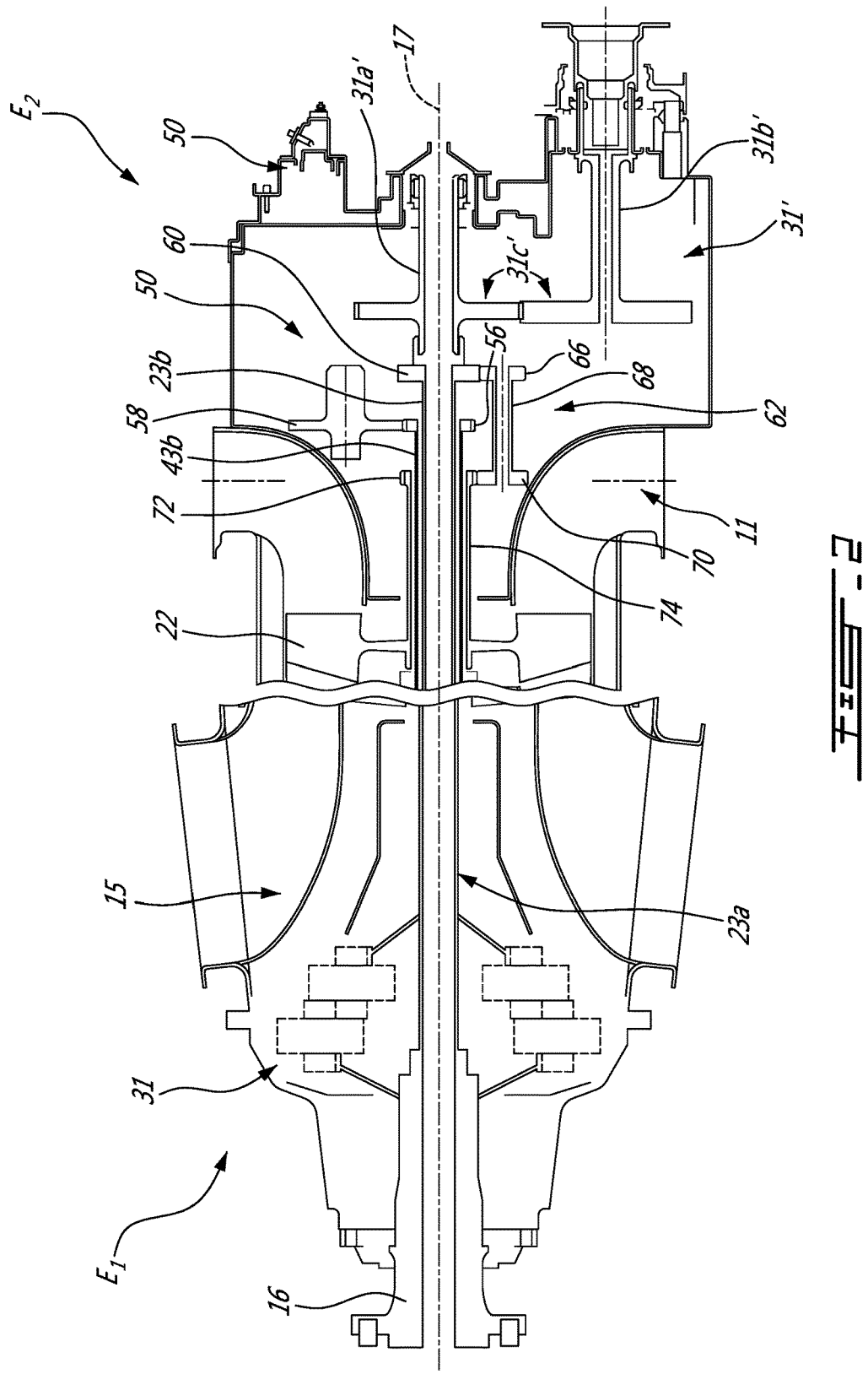

TURBINE SHAFT POWER TAKE-OFF

CROSS-REFERENCE TO RELATED APPLICATIONS

This application claims priority from U.S. provisional patent application Nos. 62/363,956, filed Jul. 19, 2016, 62/363,955, filed Jul. 19, 2016; 62/363,952 filed Jul. 19, 2016; 62/363,949 filed Jul. 19, 2016; 62/363,947 filed Jul. 19, 2016 and U.S. application Ser. No. 15/266,321 filed Sep. 15, 2016, the entire contents of each of which are incorporated by reference herein.

TECHNICAL FIELD

The application relates generally to gas turbine engine and, more particularly, to a multi-spool engine shaft architecture.

BACKGROUND OF THE ART

It is common practice to derive shaft power from gas turbine engine rotors to provide power to external equipment and drive external loads. A reduction gearbox is typically used to provide a speed output different from the input speed of the turbine rotors. The positioning of the gearbox is typically dictated by the engine architecture to the detriment of other considerations, such as compactness, engine re-configurability and component accessibility.

There is, thus, a need for improvement.

SUMMARY

In one aspect, there is provided a multi-spool gas turbine engine comprising: a low pressure (LP) spool and a high pressure (HP) spool independently rotatable of one another about an engine axis, the LP spool comprising an LP turbine, an LP compressor and an LP shaft, the HP pressure spool comprising an HP turbine, an HP compressor and an HP shaft; the LP turbine being in fluid flow communication with the HP turbine and disposed downstream therefrom, the HP compressor being in fluid flow communication with the LP compressor and disposed downstream therefrom, the LP shaft having an upstream shaft portion extending upstream of the LP turbine to a location upstream of the LP compressor to provide a first power take-off at an upstream end of the engine and a downstream shaft portion extending downstream of the LP turbine to provide a second power take-off at a downstream end of the engine.

In another aspect, there is provided a multi-spool gas turbine engine comprising: a low pressure (LP) spool; a high pressure (HP) spool; the LP and HP spools independently rotatable of one another about an engine axis; the LP spool comprising an LP turbine drivingly connected to an LP compressor by an LP shaft, the LP turbine disposed downstream of the LP compressor relative to a flow of gases through the engine, the LP shaft having an upstream and a downstream shaft portion extending in opposite directions from the LP turbine to an upstream end and a downstream end of the engine, respectively, the upstream shaft portion of the LP shaft extending axially through the LP compressor to a location upstream of the LP compressor at the upstream end of the engine; the HP pressure spool comprising an HP turbine drivingly connected to an HP compressor by an HP shaft; an accessory gear box (AGB) disposed at the upstream end of the engine upstream of the LP compressor and drivingly connected to the HP spool; and a reduction gearbox (RGB) disposed at the upstream or the downstream end of the engine and drivingly connected to a corresponding output end of the upstream or downstream shaft portion of the LP shaft.

DESCRIPTION OF THE DRAWINGS

Reference is now made to the accompanying figures in which:

FIG. 2 is a broken cross-section of the engine shown in FIG. 1 illustrating the power turbine outputs at opposed ends of the engine.

DETAILED DESCRIPTION

Figure 1:
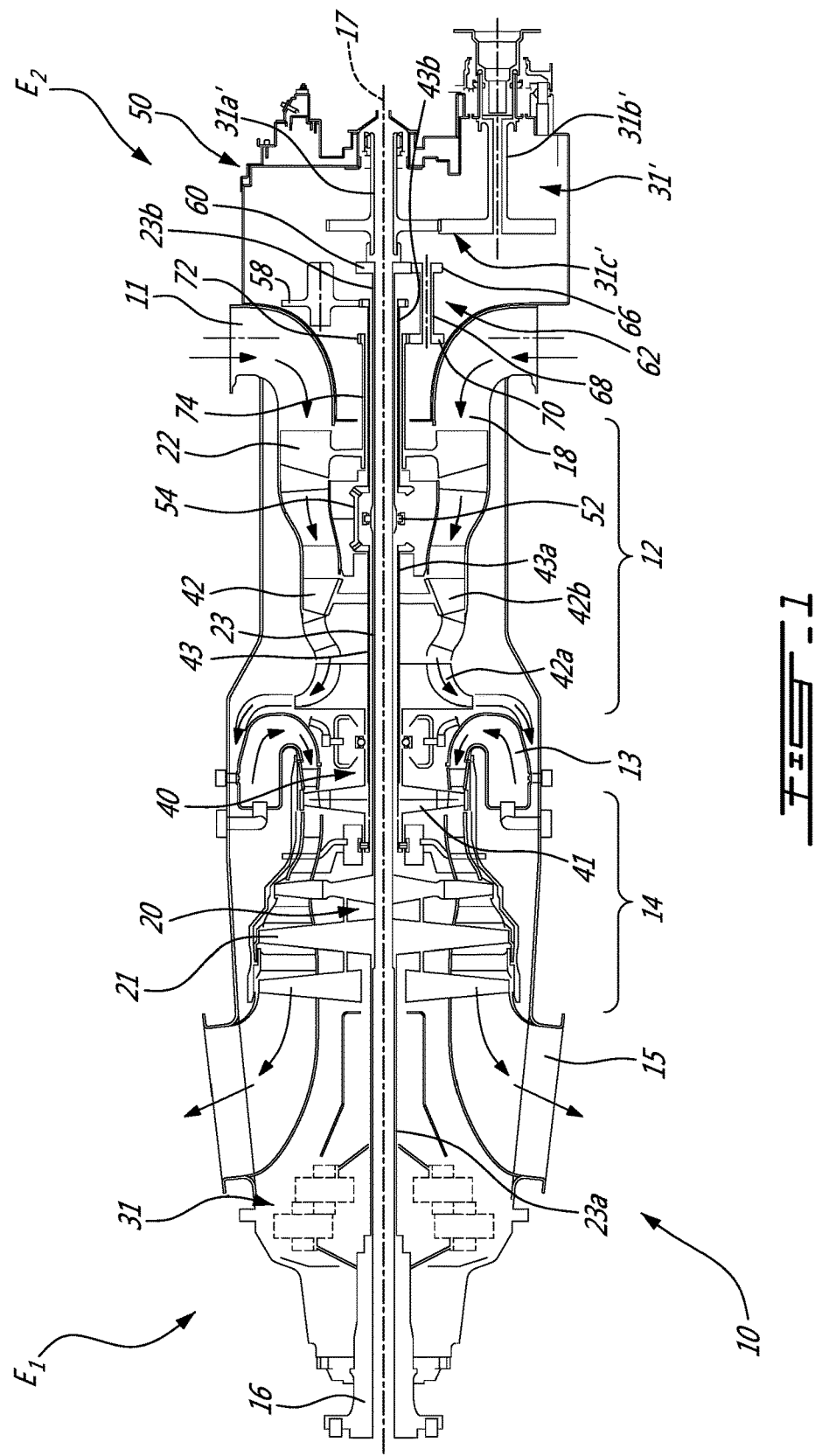
FIG. 1 is a schematic cross-sectional view of a multi-spool gas turbine engine illustrating a thru shaft mechanical concept with front and rear power turbine outputs allowing the possibility of having a reduction gear box (RGB) at the front or rear end of the engine or even at both ends of the engine.

FIG. 1 illustrates a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust outlet 15 through which the combustion gases exit the engine 10. The compressor and turbine rotors are mounted for rotation about an engine axis 17. According to one embodiment, the engine 10 may also include an output shaft 16 (e.g. a propeller shaft) configured to drive a propeller or a rotor, such as a helicopter main rotor. Depending on the intended use, the engine 10 can be configured as a turboprop engine or a turboshaft engine. Also, as will be seen herein after, the engine has a thru shaft architecture that provides a power take-off at both ends of the engine, thereby allowing the engine to be configured as a "through-flow" engine or as a "reverse-flow" engine.

The gas turbine engine 10 has an axially extending central core which defines a gaspath 18 through which gases flow, as depicted by flow arrows in FIG. 1. If a propeller (not shown) is mounted to the output shaft 16 or if the output shaft 16 is used to drive another rotatable load, the end E1 of the engine can be viewed as the front end of the engine and as such the engine may be said to be a "reverse-flow" engine because gases flow through the gaspath 18 from the air inlet 11 at a rear portion of the engine, to the exhaust outlet 15 at a front portion thereof. This is in contrast to "through-flow" gas turbine engines in which gases flow through the core of the engine from a front portion to a rear portion.

As shown in FIG. 1, the engine 10 can also be configured as a through-flow engine by providing a power take-off at the other end E2 of the engine (i.e. on the right hand side of FIG. 1). For instance, the engine may be configured as a turboshaft with a reduction gearbox (RGB) 31' provided at the end E2 of the engine to drive a rotatable load, such as a helicopter rotor. In such a case, the front end of the engine 10 may be viewed as corresponding to end E2 and the gases can be said to flow from a front end portion of the engine to a rear end portion thereof.

Still referring to FIG. 1, the engine 10 has multiple spools which perform compression to pressurize the air received through the air inlet 11, and which extract energy from the combustion gases before they exit the gaspath 18 via the exhaust outlet 15. More particularly, the illustrated embodiment comprises a low pressure (LP) spool 20 and a high pressure (HP) spool 40 mounted for rotation about the engine axis 17. The LP and HP spools 20, 40 are independently rotatable about the axis 17. The term "spool" is herein intended to broadly refer to drivingly interconnected rotors such as turbine and compressor rotors and is, thus, not limited to a single shaft compressor/turbine rotor assembly. For instance, as will be seen hereinafter, the term "spool" includes a low pressure turbine drivingly connected to a geared low pressure compressor, the LP compressor rotating at a different speed than the LP turbine.

The LP spool 20 includes at least one component to compress the air that is part of the compressor section 12, and at least one component to extract energy from the combustion gases that is part of the turbine section 14. More particularly, the LP spool 20 has an LP turbine 21, also known as a power turbine, which may include different number of stages (three stages in the illustrated embodiment), and which drives an LP compressor 22 (also referred to as a boost). The LP turbine 21 drives the LP compressor 22, thereby causing the LP compressor 22 to pressurize incoming air from the air inlet 11. The LP compressor 22 is disposed just downstream of the air inlet 11 relative to the incoming flow of air. The term "upstream" and "downstream" are used herein in relation to the flow of gasses through the engine 10. Both the LP turbine 21 and the LP compressor 22 are disposed along the engine axis 17. In the depicted embodiment, both the LP turbine 21 and the LP compressor 22 include rotatable components having an axis of rotation that is coaxial with the engine axis 17. It is understood that they may include one or more stages depending upon the desired engine thermodynamic cycle.

The LP turbine 21 is downstream of the LP compressor 22. The LP turbine 21 is also upstream of the exhaust outlet 15. The LP compressor 22 is downstream of the air inlet 11 and upstream of the LP turbine 21.

The LP spool 20 further comprises an LP shaft 23 coaxial with engine axis 17. The LP turbine 21 is drivingly connected to the LP shaft 23. The LP shaft 23 allows the LP turbine 21 to drive the LP compressor 22 during operation of the engine 10. As will be discussed in greater details hereinbelow, the LP shaft 23 may be drivingly connected to the LP compressor 22 via a gear train 62, thereby allowing the LP compressor 22 to run at a different rotational speed from the LP turbine 21. This can provide more flexibility in the selection of design points for the LP compressor 22 while at the same time allowing to drivingly connect an axially mounted accessory gear box (AGB) to the HP spool 40 centrally through the LP compressor 22, thereby minimizing the engine envelope in a direction radial from the engine axis 17 as compared to conventional boosted engines with side-mounted AGBs driven via a tower shaft.

Still referring to FIG. 1, it can be appreciated that the LP shaft 23 has a downstream portion 23a extending downstream of the LP turbine 21 to provide a drive output or power take-off at engine end E1 for driving the output shaft 16. The downstream portion 23a of the LP shaft 23 is drivingly connected to the output shaft 16 via a suitable reduction gear box (RGB) 31. As shown, the RGB 31 may be coaxial to the engine axis 17 at the engine end E1. A rotatable load, such as a propeller (not shown) is connectable to a front end of the output shaft 16. In this way, the LP turbine 21 can be used to drive the rotatable load (e.g. the propeller) at a reduced speed relative to the speed of the LP turbine 21. In such a configuration, during operation of the engine 10, the LP turbine 21 drives the rotatable load such that a rotational drive produced by the LP turbine 21 is transferred to the rotatable load via the LP shaft 23, the RGB 31 and the output shaft 16 coming out from the RGB 31. The rotatable load can therefore be any suitable component, or any combination of suitable components, that is capable of receiving the rotational drive from the LP turbine section 21.

The RGB 31 processes and outputs the rotational drive transferred thereto from the LP turbine 21 via the downstream portion 23a of the LP shaft 23 through known gear reduction techniques. The RGB 31 allows for the load (e.g. a propeller for a turboprop application) to be driven at its optimal rotational speed, which is different from the rotational speed of the LP turbine 21. The RGB 31 is axially mounted at the end E1 of the engine 10. In the illustrated embodiment, the RGB 31 has an input and an output axis parallel (coaxial in the illustrated embodiment) to the engine axis 17.

In an alternate embodiment where the engine 10 is a turboshaft, the rotational load (which may include, but is not limited to, helicopter main rotor(s) and/or tail rotor(s), propeller(s) for a tilt-rotor aircraft, pump(s), generator(s), gas compressor(s), marine propeller(s), etc.) is driven by the LP turbine 21 via the RGB 31, or the RGB 31 may be omitted such that the output of the engine 10 is provided directly by the downstream portion 23a of the LP shaft 23.

The LP shaft 23 also has an upstream shaft portion 23b extending upstream of the LP turbine 21. It is the upstream shaft portion 23b which drivingly connects the LP turbine 21 to the LP compressor 23. In addition to providing a drive input to the LP compressor 22, the upstream portion 23b of the LP shaft 23 provides a second drive output at the engine end E2. According to the illustrated embodiment, the upstream portion 23b of the LP shaft 23 extends centrally through the LP compressor 22 to a location upstream thereof for providing a drive input to a second RGB 31'. Accordingly, the engine 10 can be configured with an RGB at both ends E1, E2 of the engine or with a single RGB at a selected one of the engine ends E1, E2. That is the LP shaft 23 with its downstream and upstream portions 23a, 23b provides drive outputs at opposed ends E1, E2 of the engine, thereby allowing positioning of RGBs at both or a selected one of the engine ends.

The LP shaft 23 with the portions 23a, 23b thereof extending downstream and upstream of the LP turbine 21 provides a thru shaft arrangement between opposed ends E1, E2 of the engine. Modularity criteria for gas turbine engines may motivate the use of distinct shaft sections in opposed axial directions from the LP turbine 21. The shaft sections may be drivingly connected by axial splines or any other suitable drive connections. The LP shaft 23 may comprise any suitable number of shaft segments. However, whether the LP shaft 23 is of unitary construction or segmented, the LP turbine 21 provides rotational drive outputted at each end of the engine (that is upstream and downstream of the LP turbine 21).

In the illustrated embodiment, the upstream end of the upstream portion 23b of the LP shaft 23 is drivingly connected via axial splines or the like to the input shaft 31a' of the RGB 31'. In the illustrated embodiment, the input shaft 31a' is coaxial to the engine axis 17. The input shaft 31a' is, in turn, drivingly connected to an RGB output shaft 31b' by a suitable set of gears 31c'. In the illustrated example, the RGB output shaft 31b' is parallel to the LP shaft 23 and, thus, the engine axis 17. The RGB output shaft 31b' is configured to be operatively connected to a rotatable load, such as a helicopter rotor. As can be appreciated from FIG. 1, both RGBs 31 and 31' can be coaxially mounted relative to the engine axis 17 at opposed ends E1, E2 of the engine.

In light of the preceding, it can be appreciated that the LP turbine 21 drives both the rotatable load and the LP compressor 22. Furthermore, the rotatable load, when mounted to the engine 10, and the LP compressor 22 can be disposed on the same or on opposite ends of the LP turbine 21. It can thus be appreciated that one or more LP turbine stages are used to drive elements upstream of the LP turbine (e.g. LP compressor 22, RGB 31', etc.) as well as to drive elements downstream of the LP turbine (e.g. RGB 31, output shaft 16). The configuration of the LP shaft 23 allows it to simultaneously drive the rotatable loads at either end of the engine as well as the LP compressor 22.

Referring to FIGS. 1 and 2, it can be appreciated that a boost gear train 62 may be provided upstream of the air inlet 11 to drivingly couple the LP shaft 23 and, thus, the LP turbine 21 to the LP compressor 22. As mentioned herein above, the gear connection between the LP turbine 21 and the LP compressor 22 is advantageous in that it allows driving the LP compressor 22 at a different speed than the LP turbine 21. It can, thus, allow for overall thermodynamic cycle performance improvement.

The gear train 62 comprises an input gear 60 provided at the distal end portion of the LP shaft 23 and in meshing engagement with a second gear 66 mounted at an end of a transfer shaft 68 having a rotation axis parallel to the engine axis 17. A third gear 70 is provided at an opposed end of the transfer shaft 68 for meshing engagement with a fourth gear 72 provided at the distal end of a LP compressor shaft 74 projecting in an upstream direction from the LP compressor hub. The boost gear train 62 can adopt various configurations and is, thus, not limited to the gear train architecture shown in FIGS. 1 and 2. For instance, the gear train 62 could be provided as a dual gear train to provide first and second drive inputs to the LP compressor 22. The dual gear train 62 could comprise first and second sets of gears provided on opposed lateral sides of the LP shaft 23 and drivingly connected to the same input gear 60.

Referring to FIG. 1, the HP spool 40 has at least one component to compress the air that is part of the compressor section 12, and at least one component to extract energy from the combustion gases that is part of the turbine section 14. The HP spool 40 is also disposed along the center axis 17 and includes a HP turbine 41 (also referred to as the compressor turbine) drivingly engaged (e.g. directly connected) to an HP compressor 42 by an HP shaft 43 rotating independently of the LP shaft 23. In the illustrated embodiment, the HP shaft 43 is a hollow shaft which rotates around the LP shaft 23. That is the LP shaft 23 extends axially through the HP shaft 43. The HP turbine 41 and the HP compressor 42 may include one or more stages of rotors, depending upon the desired engine thermodynamic cycle, for example. In the depicted embodiment, the HP compressor 42 includes a centrifugal compressor 42a or impeller and an axial compressor 42b, both of which are driven by the HP turbine 41. During operation of the engine 10, torque is transferred from HP turbine 41 to the HP compressor 42 via HP shaft 43.

The HP turbine 41 is upstream of the LP turbine 21, and downstream of the combustor 13. The HP compressor 42 is upstream of the combustor 13, and downstream of the LP compressor 22. From this arrangement of the HP turbine 41 and the HP compressor 42, it can be appreciated that during operation of the engine 10, the LP compressor 22 driven by the LP turbine 21 feeds pressurized air to the HP compressor 42. Therefore, the pressurized air flow produced by the LP compressor 22 is provided to the HP compressor 42 and contributes to the work of both the LP turbine 21 and the HP turbine 41.

It can thus be appreciated that the presence of the above-described LP and HP spools 20, 40 provides the engine 10 with a "split compressor" arrangement. More particularly, some of the work required to compress the incoming air is transferred from the HP compressor 42 to the LP compressor 22. In other words, some of the compression work is transferred from the HP turbine 41 to the more efficient LP turbine 21. This transfer of work may contribute to higher pressure ratios while maintaining a relatively small number of rotors. In a particular embodiment, higher pressure ratios allow for higher power density, better engine specific fuel consumption (SFC), and a lower turbine inlet temperature (sometimes referred to as "T4") for a given power. These factors can contribute to a lower overall weight for the engine 10.

In light of the preceding, it can be appreciated that the LP turbine 21 is the "low-speed" and "low pressure" turbine section when compared to the HP turbine 41. The LP turbine 21 is sometimes referred to as the "power turbine". The turbine rotors of the HP turbine 41 spin at a higher rotational speed than the turbine rotors of the LP turbine 21 given the closer proximity of the HP turbine 41 to the outlet of the combustor 13. Consequently, the compressor rotors of the HP compressor 42 may rotate at a higher rotational speed than the compressor rotors of the LP compressor 22.

The HP turbine 41 and the HP compressor 42 can have any suitable mechanical arrangement to achieve the above-described split compressor functionality. For example, and as shown in FIG. 1, the HP shaft 43 extends concentrically about the LP shaft 23 and is independently rotatable relative thereto. The relative rotation between the HP shaft 43 and the LP shaft 23 allow the shafts 23, 43 to rotate at different rotational speeds, thereby allowing the HP compressor 42 and the LP compressor 22 to rotate at different rotational speeds. The HP shaft 43 can be mechanically supported by the LP shaft 23 using bearings or the like. Alternatively, the shafts 23, 43 can be separately supported.

Referring to FIGS. 1 and 2, the engine 10 also includes an accessory gearbox (AGB) 50. The AGB 50 receives a rotational input from the HP spool 40 and, in turn, drives accessories (e.g. fuel pump, starter-generator, oil pump, scavenge pump, etc.) that contribute to the functionality of the engine 10. The AGB 50 can be designed with side-facing accessories, top-facing accessories, or axially-facing accessories depending on the installation needs.

The AGB 50 is coaxially mounted with respect to the engine axis 17 upstream of the air inlet 11 as an axial extension of the engine envelope. The axial positioning or in-line mounting of the AGB 50 allows minimizing the overall radial envelope of the engine as compared to a split compressor or boosted engine having the AGB mounted on a radially outer surface of the engine and connected to the HP spool via a tower shaft. In the illustrated embodiment, the AGB 50 is accommodated within the envelope of the engine in a plane normal to the central axis 17.

In the illustrated embodiment, the AGB input drive axis is coaxial to the LP compressor centerline and, thus, the engine axis 17. By so aligning the input axis of the AGB 50 relative to the LP compressor centerline, the drive input to the AGB 50 can be provided centrally through the LP compressor 22, thereby eliminating the need for a tower shaft and an externally mounted gear arrangement. In the illustrated embodiment, the HP shaft 43 extends through a central bore or passage in the LP compressor 22 concentrically within LP compressor shaft 74. The HP shaft 43 project axially out of the LP compressor shaft 74 to provide a drive input to the AGB 50 coaxial to the engine axis 17. According to the embodiment illustrated, the HP shaft 43 is segmented between the HP compressor 42 and the LP compressor 22 to allow for the introduction of a bearing 52 to provide support to the LP shaft 23 between the HP compressor 42 and the LP compressor 22. A gear 54 is provided to drivingly couple the HP compressor shaft segment 43a of the HP shaft 43 to an AGB drive input shaft segment 43b, which may also be viewed as being an extension of the HP shaft 43. The gear 54 may be provided in the form of a bevel gear having a 1:1 speed ratio. The bevel gear may be set to have a rotation axis perpendicular to the rotation axis of the HP shaft segments 43a, 43b. Such a gear arrangement allows for the installation of a support and bearing structure for supporting the LP shaft 21. Such a support may be suitable in some applications to address specific shaft dynamic requirements.

As best shown in FIG. 2, the AGB drive input shaft segment 43b projects axially into the AGB 50 and is provided at a distal end thereof with a gear 56, which is in meshing engagement with an associated AGB output gear 58. In the illustrated example, the AGB output gear 58 has a rotation axis parallel to the engine axis 17. The output gear 58 is drivingly connected to accessories (not shown). It is understood that the accessories gear train in the AGB 50 can adopt various configurations, including multiple outputs and different gear ratios.

In the embodiment illustrated in FIG. 1, the case of the air inlet 11 forms part of the AGB 50, boost gear train 62 and RGB 31' housing. However, it is understood that the AGB 50, the boost gear train 62 and the RGB 31' could be packaged as one stand-alone unit or even as individual units. In the illustrated embodiment, the AGB 50, boost gear train 62 and the RGB 31' share a common oil chamber or sump and are housed in a common chamber. The same oil system can be used for the AGB 50, the RGB 31' and the boost gear train 62. The positioning of the AGB 50, RGB 31' and boost gear train 62 at the upstream end of the engine in a common chamber contributes to facilitate the engine assembly and eliminate the need for a separate casing and lubricating structure for each gear system. One containment and lubricating system can be used for the AGB 50, the RGB 31' and the boost gear train 62. Such an integration of the AGB, RGB and the boost gear train facilitate the access to the gears for adjustment purposes while minimizing part counts.

The mounting of the AGB 50 and the RGB 31' at the upstream end E2 of the engine in line with the engine core turbine and compressor components (that is as an axial extension thereto) provides for a compact cigar-like engine shape similar to that of the well-known PT6 engine manufactured by Pratt & Whitney Canada. The LP pressure shaft architecture with the power take-offs at both ends E1, E2 of the engine allows positioning the RGB at the upstream end E2 of the engine together with the AGB or at the opposite end E1. According to both alternatives, the AGB 50 may be mounted at the upstream end E2 of the engine like for a traditional PT6 style engine architecture which does not has a split compressor configuration. It is worthwhile noting that according to some applications, a RGB could be provided at both ends E1 and E2, as shown in FIG. 1.

It can thus be appreciated that at least some of the embodiments of the engine 10 disclosed herein provide a mechanical architecture of turbomachinery that allows for a split compressor system in a compact PT6 type configuration. Such a split compressor engine in a reverse flow or through flow configuration may be used for aircraft nose installations, as well as for wing installations. The boost gear train 62 eliminates the need for a tower shaft for connecting the AGB 50 to the HP spool 40. Indeed, with this engine architecture, the HP shaft can be axially directly connected to the AGB, the AGB having an input axis coaxial to the engine axis 17. In this way no shaft has to be passed across the gaspath to drivingly connect the HP spool 40 to the AGB 50, thereby avoiding performances losses. The compressor aerodynamics can be improved by eliminating the service strut typically used to pass the tower shaft. The engine weight may be reduced by eliminating the need of an upstream transfer case. The position of the hardware used to build the gear trains may be designed for an optimal clearance from the LP rotor center. It can also be appreciated that at least some embodiments allow locating the AGB along the engine centerline upstream of the LP compressor. This may provide installation benefits, reduce cost and weight relative to an externally mounted tower shaft driven AGB.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A multi-spool gas turbine engine comprising: a low pressure (LP) spool and a high pressure (HP) spool independently rotatable of one another about an engine axis, the LP spool comprising an LP turbine, an LP compressor and an LP shaft, the HP pressure spool comprising an HP turbine, an HP compressor and an HP shaft; the LP turbine being in fluid flow communication with the HP turbine and disposed downstream therefrom, the HP compressor being in fluid flow communication with the LP compressor and disposed downstream therefrom, the LP shaft having an upstream shaft portion extending upstream of the LP turbine to a location upstream of the LP compressor to provide a first power take-off at an upstream end of the engine and a downstream shaft portion extending downstream of the LP turbine to provide a second power take-off at a downstream end of the engine.

2. The multi spool gas turbine engine defined in claim 1, further comprising an accessory gearbox (AGB) disposed at the upstream end of the engine upstream of the LP compressor, the AGB being drivingly connected to the HP spool.

3. The multi spool gas turbine engine defined in claim 2, further comprising a reduction gear box (RGB) disposed at the upstream or downstream end of the engine for connection to a selected one of the first and second power take-offs of the LP shaft.

4. The multi-spool gas turbine engine defined in claim 3, wherein the AGB and the RGB are both disposed at the upstream end of the engine upstream of the LP compressor.

5. The multi-spool gas turbine engine defined in claim 4, wherein the HP shaft extends axially through the LP compressor and is drivingly connected to the AGB upstream of the LP compressor, and wherein the upstream shaft portion of the LP shaft also extends axially through the LP compressor and is drivingly connected to the RGB upstream of the LP compressor, the HP shaft and the upstream shaft portion of the LP shaft being concentric.

6. The multi-spool gas turbine engine defined in claim 5, wherein the AGB and the RGB have respective input axis coaxial to the engine axis.

7. The multi-spool engine defined in claim 4, wherein the RGB and the AGB share a common casing.

8. The multi-spool gas turbine engine defined in claim 3, wherein the RGB is disposed at the downstream end of the engine downstream of the LP turbine.

9. The multi-spool gas turbine engine defined in claim 8, wherein the RGB is drivingly connected to a propeller shaft.

10. The multi-spool engine defined in claim 1, wherein the LP shaft extends from the upstream end to the downstream end of the engine along the engine axis, and wherein the upstream shaft portion of the LP shaft is drivingly coupled to the LP compressor via a gear train.

11. The multi-spool engine defined in claim 10, wherein the upstream shaft portion is also drivingly connected to a reduction gear box (RGB) disposed downstream of the LP compressor.

12. The multi-spool engine defined in claim 3, wherein a second RGB is drivingly connected to the other one of the first and second drive outputs of the LP shaft.

13. A multi-spool gas turbine engine comprising: a low pressure (LP) spool; a high pressure (HP) spool; the LP and HP spools independently rotatable of one another about an engine axis; the LP spool comprising an LP turbine drivingly connected to an LP compressor by an LP shaft, the LP turbine disposed downstream of the LP compressor relative to a flow of gases through the engine, the LP shaft having an upstream and a downstream shaft portion extending in opposite directions from the LP turbine to an upstream end and a downstream end of the engine, respectively, the upstream shaft portion of the LP shaft extending axially through the LP compressor to a location upstream of the LP compressor at the upstream end of the engine; the HP pressure spool comprising an HP turbine drivingly connected to an HP compressor by an HP shaft; an accessory gear box (AGB) disposed at the upstream end of the engine upstream of the LP compressor and drivingly connected to the HP spool; and a reduction gearbox (RGB) disposed at the upstream or the downstream end of the engine and drivingly connected to a corresponding output end of the upstream or downstream shaft portion of the LP shaft.

14. The multi-spool gas turbine engine defined in claim 13, further comprising an air inlet upstream of the LP compressor, and wherein the AGB and the RGB are both disposed at the upstream end of the engine upstream of the air inlet.

15. The multi-spool gas turbine engine defined in claim 14, wherein the upstream shaft portion of the LP shaft is drivingly connected to both the LP compressor and the RGB.

16. The multi-spool gas turbine engine defined in claim 14, wherein the HP shaft extends centrally through the LP compressor to a location upstream of the LP compressor for connection to the AGB.

17. The multi-spool gas turbine engine defined in claim 16, wherein the upstream shaft portion of the LP shaft projects coaxially out of the HP shaft to a location upstream of an upstream end of the HP shaft.

18. The multi-spool gas turbine engine defined in claim 17, wherein the upstream portion of the LP shaft is drivingly connected to the LP compressor via a gear train disposed upstream of the LP compressor.

19. The multi-spool gas turbine engine defined in claim 18, wherein the gear train, the AGB and the RGB are housed in a common casing.

20. The multi-spool gas turbine engine defined in claim 13, wherein the AGB and the RGB have respective input axis coaxial to the engine axis.

* * * * *